US012519755B2

(12) United States Patent
Andrews et al.

(10) Patent No.: US 12,519,755 B2
(45) Date of Patent: Jan. 6, 2026

(54) SECURE DATA ROUTING AND RANDOMIZATION IN WINDOWS

(71) Applicant: SCATR LLC, Sheridan, WY (US)

(72) Inventors: John G. Andrews, Cleveland Heights, OH (US); John P. Keyerleber, Richmond Heights, OH (US); Tomas H. McMonigal, Charlotte, NC (US)

(73) Assignee: SCATR CORP, Cleveland, OH (US)

( * ) Notice: Subject to any disclaimer, the term of this patent is extended or adjusted under 35 U.S.C. 154(b) by 75 days.

(21) Appl. No.: 18/361,721

(22) Filed: Jul. 28, 2023

(65) Prior Publication Data

US 2025/0039153 A1 Jan. 30, 2025

(51) Int. Cl.

*H04L 9/40* (2022.01)
*H04L 9/08* (2006.01)
*H04L 12/46* (2006.01)

(52) U.S. Cl.

CPC .......... *H04L 63/029* (2013.01); *H04L 9/0819* (2013.01); *H04L 63/0428* (2013.01); *H04L 12/4633* (2013.01)

(58) Field of Classification Search

None
See application file for complete search history.

(56) References Cited

U.S. PATENT DOCUMENTS 6,502,135 B1 12/2002 Munger et al.
6,765,866 B1 7/2004 Wyatt
6,990,111 B2 1/2006 Lemoff et al.
7,382,782 B1 6/2008 Ferguson et al.
7,697,528 B2 4/2010 Parry et al.
7,782,782 B1 8/2010 Ferguson et al.
7,895,348 B2 2/2011 Twitchell, Jr.
7,984,495 B1 7/2011 Aravind
8,274,980 B2 9/2012 Sato et al.
8,358,658 B2 1/2013 Flynn et al.
8,416,686 B2 4/2013 Ferguson et al.
8,924,716 B2 12/2014 Miyabayashi et al.
(Continued)

FOREIGN PATENT DOCUMENTS

CN 112333152 A 2/2021
EP 3651407 A1 5/2020
(Continued)

OTHER PUBLICATIONS

Notice of Allowance dated Jun. 11, 2024, U.S. Appl. No. 18/194,413, filed Mar. 31, 2023.

(Continued)

*Primary Examiner* — Brandon Hoffman
(74) *Attorney, Agent, or Firm* — Conley Rose, P.C.; Michael W. Piper; Elexis A. Jones

(57) ABSTRACT

In some examples, a scatter network device includes a non-transitory memory, at least one processor, and a scattering application stored in the non-transitory memory. When executed by the at least one processor, the scattering application monitors a socket for the presence of data, responsive to detecting data at the socket, determines a type of the data, responsive to determining the type of the data, services the data, responsive to not detecting data at the socket, monitors for network tunnel (TUN) data, and responsive to detecting TUN data, services the TUN data.

20 Claims, 7 Drawing Sheets

500
Wait for Event to Trigger 502
Retrieve Event Information (i.e event type, event socket or TUN, event type callback function, additional event data) 504
Call Event Callback Function 506
Channel Event Callback Function
Key Exchange Callback Function
TUN Callback Function
Decrypt and Remove Header 508
Handle Out-of-Band Key Exchange Request 518
Validate IP Message, Add Header, Encrypt, and Select Random Channel 520
Write Packet to Channel 522
Handle Message Type 510
IP Message
Key Exchange
Config Update Message
Write Packet to TUN 512
Handle In-Band Key Exchange Request 514
Update Configs 516

(56) References Cited

U.S. PATENT DOCUMENTS 8,955,110 B1 2/2015 Twitchell, Jr.
9,116,734 B1 8/2015 Twitchell, Jr. et al.
9,185,046 B2 11/2015 Ferguson et al.
9,225,699 B2 12/2015 Biradar et al.
9,241,026 B2 1/2016 Twitchell
9,495,194 B1 11/2016 Twitchell, Jr. et al.
9,535,805 B2 1/2017 Ananthanarayanan et al.
9,629,063 B2 4/2017 Brown et al.
9,794,797 B2 10/2017 Hoffberg
10,356,061 B2 7/2019 Fiske
10,432,526 B2 10/2019 Gafni et al.
10,469,375 B2 11/2019 Twitchell, Jr.
10,541,907 B2 1/2020 Twitchell, Jr. et al.
10,637,685 B2 4/2020 Goel et al.
10,686,729 B2 6/2020 Sindhu et al.
10,715,327 B1 7/2020 Ramanujan et al.
10,826,711 B2 11/2020 Barry
10,826,876 B1 11/2020 Sinn et al.
10,833,972 B2 11/2020 Vaughan et al.
10,904,367 B2 1/2021 Goel et al.
10,965,586 B2 3/2021 Goel et al.
11,153,276 B1 10/2021 Keyerleber
11,171,934 B2 11/2021 Fiske
11,178,262 B2 11/2021 Goel et al.
11,184,147 B2 11/2021 Ghorbani
11,381,557 B2 7/2022 Kim et al.
11,469,922 B2 10/2022 Goel et al.
11,533,617 B2 12/2022 Mihelich et al.
11,558,422 B2 1/2023 Twitchell, Jr. et al.
11,601,359 B2 3/2023 Goel et al.
11,637,694 B2 4/2023 Islamov
11,777,839 B2 10/2023 Sindhu et al.
11,805,127 B1 10/2023 Sundar et al.
11,895,015 B1 2/2024 Budhia et al.
12,021,972 B2 6/2024 Wang et al.
12,120,028 B1 10/2024 Andrews et al.
12,335,160 B2 6/2025 Andrews et al.
2001/0050914 A1 12/2001 Akahane et al.
2001/0054158 A1 12/2001 Jarosz
2002/0191797 A1 12/2002 Perlman
2003/0112755 A1 6/2003 McDysan
2004/0103205 A1 5/2004 Larson et al.
2006/0008082 A1 1/2006 Gluck et al.
2007/0217424 A1 9/2007 Kim et al.
2010/0149988 A1 6/2010 Matsubara et al.
2011/0179136 A1 7/2011 Twitchell, Jr.
2011/0271096 A1* 11/2011 Bharrat ............... H04L 63/0485 713/153
2012/0204032 A1 8/2012 Wilkins et al.
2014/0115341 A1 4/2014 Robertson
2015/0326603 A1 11/2015 Deisinger et al.
2015/0350245 A1 12/2015 Twitchell, Jr. et al.
2015/0350246 A1 12/2015 Bergman
2016/0065370 A1 3/2016 Le Saint et al.
2016/0119291 A1 4/2016 Zollinger et al.
2016/0255054 A1 9/2016 Wan et al.
2017/0019256 A1 1/2017 Rhelimi
2017/0033925 A1 2/2017 DeNeut et al.
2017/0126626 A1 5/2017 Datta et al.
2017/0149740 A1 5/2017 Mansour et al.
2017/0331794 A1 11/2017 Lokman et al.
2017/0372048 A1 12/2017 Liu et al.
2018/0316598 A1 11/2018 Twitchell, Jr.
2018/0375663 A1 12/2018 Le Saint et al.
2019/0014092 A1 1/2019 Malek et al.
2019/0294464 A1 9/2019 Twitchell, Jr. et al.
2019/0373458 A1 12/2019 Dandekar et al.
2020/0014619 A1 1/2020 Shelar et al.
2020/0154272 A1 5/2020 Uy et al.
2020/0195439 A1 6/2020 Suresh et al.
2020/0211002 A1 7/2020 Steinberg
2020/0213111 A1 7/2020 Leavy et al.
2020/0213151 A1 7/2020 Srivatsan et al.
2020/0226258 A1 7/2020 Nix
2020/0259640 A1 8/2020 Leavy et al.
2021/0051146 A1 2/2021 Stolbikov et al.
2021/0105301 A1 4/2021 Anderson et al.
2021/0144004 A1 5/2021 Gray et al.
2021/0168138 A1 6/2021 Paruchuri
2021/0184854 A1 6/2021 Pizot et al.
2021/0297351 A1 9/2021 Vegesna et al.
2021/0328779 A1 10/2021 Ruan
2021/0328976 A1 10/2021 Leavy et al.
2021/0352471 A1 11/2021 Hallock
2021/0360026 A1 11/2021 Anderson et al.
2022/0247678 A1 8/2022 Atwal et al.
2022/0392286 A1 12/2022 Elrad et al.
2023/0006993 A1 1/2023 Bilgin et al.
2023/0097712 A1 3/2023 Sullivan et al.
2023/0164086 A1 5/2023 York et al.
2023/0188347 A1 6/2023 Sarin
2023/0198914 A1 6/2023 Ranjan et al.
2023/0208748 A1 6/2023 Goel et al.
2024/0007367 A1 1/2024 Demchenko
2024/0028367 A1 1/2024 Mathew et al.
2024/0214803 A1 6/2024 Dandekar et al.
2024/0275596 A1 8/2024 Stolbikov et al.
2024/0380726 A1 11/2024 Ban et al.

FOREIGN PATENT DOCUMENTS

WO 2018160863 A1 9/2018
WO 2023134844 A1 7/2023

OTHER PUBLICATIONS

Office Action dated Nov. 27, 2024, U.S. Appl. No. 18/345,829, filed Jun. 30, 2023.
Syed, et al., "Zero Trust Architecture (ZTA): A Comprehensive Survey", IEEE Access—Digital Object Identifier, vol. 10, 37 pages, 2022.
Shu, et al., "Secure Data Collection in Wireless Sensor Networks Using Randomized Dispersive Routes", IEEE Transactions on Mobile Computing, vol. 9, No. 7, Jul. 2010, 14 pages.
Andrews, John G., et al., "Secure Data Routing With Channel Resiliency," filed Sep. 11, 2024, U.S. Appl. No. 11/882,552.
Notice of Allowance dated Jun. 22, 2021, U.S. Appl. No. 16/683,146, filed Nov. 13, 2019.
Office Action dated Apr. 12, 2023, U.S. Appl. No. 17/481,914, filed Sep. 22, 2022.
Final Office Action dated Jul. 24, 2023, U.S. Appl. No. 17/481,914, filed Sep. 22, 2022.
Keyerleber, John P., et al., "Secure Data Routing and Randomization," filed Sep. 22, 2021, U.S. Appl. No. 17/481,914.
Andrews, John G., et al., "Secure Data Routing With Channel Resiliency," filed Mar. 31, 2023, U.S. Appl. No. 18/194,413.
Andrews, John G., et al., "Out of Band Key Exchange," filed Jun. 30, 2023, U.S. Appl. No. 18/345,819.
Andrews, John G., et al., "Network Traffic Obfuscation," filed Jun. 30, 2023, U.S. Appl. No. 18/345,829.
Andrews, John G., et al., "Endpoint Validation Security," filed Jun. 30, 2023, U.S. Appl. No. 18/345,837.
Andrews, John G., et al., "Secure Data Routing With Dynamic Packet Spoofing," filed Jun. 30, 2023, U.S. Appl. No. 18/345,847.
Advisory Action dated Oct. 5, 2023, U.S. Appl. No. 17/481,914, filed Sep. 22, 2022.
Examiner's Answer to Appeal Brief dated Feb. 23, 2024, U.S. Appl. No. 17/481,914, filed Sep. 22, 2022.
Office Action dated Feb. 13, 2024, U.S. Appl. No. 18/194,413, filed Mar. 31, 2023.
Keyerleber, John P., "Machine Learning Driven Network Traffic Obfuscation," filed Jan. 24, 2024, U.S. Appl. No. 18/421,960.
Keyerleber, et al., "Optimizing Network Traffic Obfuscation Based on Network Performance Using Reinforcement Learning," filed Jan. 24, 2024, U.S. Appl. No. 18/421,965.
Keyerleber, et al., "Optimizing Network Traffic Obfuscation Based on Aggregated Network Performance," filed Jan. 24, 2024, Application No. Jan. 24, 2024.

(56) References Cited

OTHER PUBLICATIONS

Notice of Allowance dated Feb. 21, 2025, U.S. Appl. No. 18/345,847, filed Jun. 30, 2023.
Office Action dated May 7, 2025, U.S. Appl. No. 18/345,819, filed Jun. 30, 2023.
Notice of Allowance dated May 20, 2025, U.S. Appl. No. 18/345,829, filed Jun. 30, 2023.
Office Action dated Jul. 11, 2025, U.S. Appl. No. 18/345,837, filed Jun. 30, 2023.
Notice of Allowance dated Sep. 3, 2025, U.S. Appl. No. 18/345,819, filed Jun. 30, 2023.
Notice of Allowance dated Oct. 27, 2025, U.S. Appl. No. 18/345,837, filed Jun. 30, 2023.
Decision on Appeal dated Nov. 18, 2025, U.S. Appl. No. 17/481,914, filed Sep. 22, 2022.

* cited by examiner

SECURE DATA ROUTING AND RANDOMIZATION IN WINDOWS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Data transmitted between two computing systems may travel via defined paths or routes, through any of a variety of publicly accessible networks (e.g., the Internet), and may use any of a variety of media, such as Ethernet or fiber cabling. In known methods of data transmission across networks, data routing is performed based on an external Internet protocol (IP) address. Data packets are generally forwarded across multiple routers to the requested IP address by the fastest path available at the time of transmission, with the packet's destination visible upon inspection.

Whenever data is moved between two points, there is a potential risk of unauthorized access to that data by an eavesdropper or other unauthorized actor. Conventional techniques to secure the transmission of confidential information typically rely upon data being encrypted by a sufficiently complex single encryption algorithm. For example, a virtual private network (VPN) establishes a virtual point-to-point connection (e.g., a so-called "secure tunnel") in which data is encrypted when it leaves one location and is decrypted at its destination, where both source and destination are identified by unique, attributable IP addresses. Any intermediate stops (hops, nodes, etc.) are also identifiable by their assigned IP address.

In the scenario above, two types of unauthorized users may attempt to access the transmitted data. First, an unauthorized user with access to an applicable encryption key (e.g., an employee of the source client that generated the data or a knowledgeable malicious actor) could observe the transmission and be able to decrypt and read the entirety of the communication. Next, an unauthorized user with no access to the applicable encryption key (e.g., an eavesdropper) may not be able to read the actual content of a communication, but may still be able to derive relevant information about the data transmission merely from observation, such as one or more of its destination, its source, its intermediate hops, the relative size (number of packets) of the transmission, the transmission type (e.g., based on destination port), and the like. Either of these bad actors could observe, capture, manipulate, divert, and/or log information about these types of transmissions. What is more, even with respect to an eavesdropper that does not have an encryption key, the actual content of a transmission may not be safe, as it is possible that a previously-accessed encrypted transmission may later become accessible. As computing resources improve, increasingly complex methods of encryption are subject to being "cracked" or broken, rendering such encryption useless. Once the encryption algorithm is broken, a hacker may be able to read unauthorized data that they previously obtained and stored.

SUMMARY

In some examples, a scatter network device includes a non-transitory memory, at least one processor, and a scattering application stored in the non-transitory memory. When executed by the at least one processor, the scattering application monitors a socket for the presence of data, responsive to detecting data at the socket, determines a type of the data, responsive to determining the type of the data, services the data, responsive to not detecting data at the socket, monitors for network tunnel (TUN) data, and responsive to detecting TUN data, services the TUN data.

In some examples, method of secure data routing in a single thread of execution includes monitoring a socket for the presence of data. The method also includes, responsive to detecting data at the socket, determining a type of the data. The method also includes, responsive to determining the data is key exchange data, servicing the key exchange data. The method also includes, responsive to determining the data is channel data, servicing the channel data. The method also includes, responsive to determining that the data is neither key exchange data nor channel data, monitoring for TUN data. The method also includes, responsive to detecting TUN data, servicing the TUN data.

In some examples, a computing device includes a non-transitory memory, at least one processor, and a scattering application stored in the non-transitory memory. When executed by the at least one processor, in a first thread of execution, the scattering application monitors a socket for the presence of data, responsive to detecting data at the socket, determine a type of the data, responsive to determining the type of the data, services the data, responsive to not detecting data at the socket, monitors for an indication that TUN data is available, and responsive to TUN data being available, obtains the TUN data from a shared resource, and writes the TUN data to the socket. In a second thread of execution, the scattering application monitors for outgoing TUN data, responsive to detecting outgoing TUN data, writes the outgoing TUN data to the shared resource, and provides the indication that TUN data is available.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
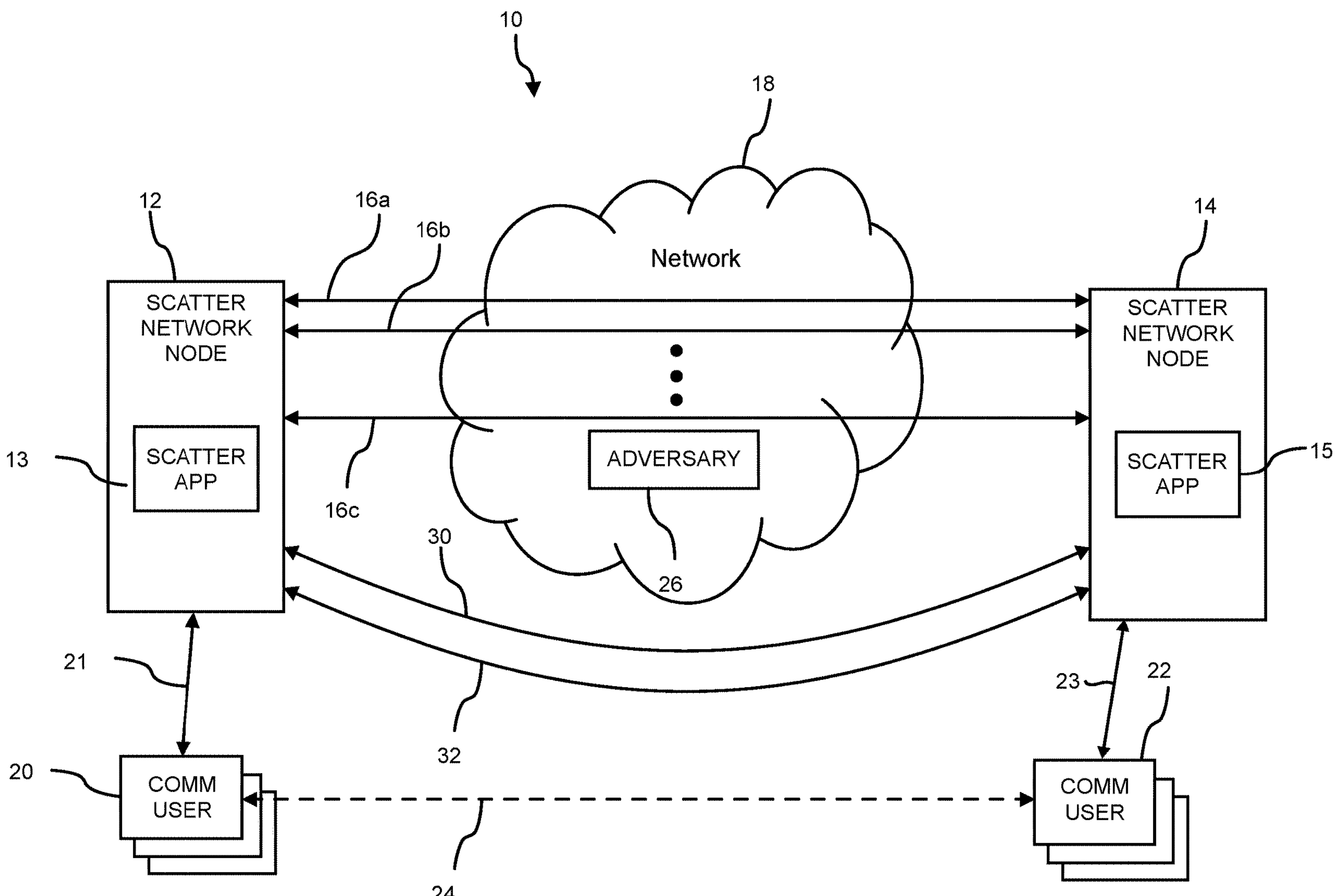
FIG. 1A is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The disclosure teaches a variety of elaborations and extensions of scatter networking technology. Communication between a source and a destination via the Internet or other communication network may be scattered by a collaborating pair of scatter network nodes. The source may be a first user device such as a mobile phone or a laptop computer; the destination may be a second user device such as a mobile phone or a laptop computer. Alternatively, the source may be the first user device and the destination may be a server application such as a social networking application executing on computer system or in a cloud computing environment or a financial services application executing on a computer system or in a cloud computing environment. For further details of scattering network communications, see U.S. Pat. No. 11,153,276 B1 issued Oct. 19, 2021, titled "Secure Data Routing and Randomizing" by John P. Keyerleber, and U.S. patent application Ser. No. 18/194,413, filed Mar. 31, 2023, titled "Secure Data Routing and Randomizing with Channel Resiliency" by John G. Andrews, et al., which is hereby incorporated by reference herein in its entirety.

Challenges can arise in creating cross-compatible software, or modifying software developed for one operating system to be operable on a second operating system (e.g., porting the software from the first operating system to the second operating system). For example, protocols, routines, or other operations that may be suitable for the first operating system (such as LINUX) may not be suitable or operable on the second operating system (such as WINDOWS).

Examples of this description provide for dual-thread and single-thread implementations of a scattering application. The scattering application may listen for, receive, service, encrypt, decrypt, encapsulate, transmit, interact with, or combinations thereof, data in a scatter network. In an example, the scattering application is implemented on a scatter network node that executes a WINDOWS operating system. In some dual-thread examples of the scattering application, a first thread may service tunnel data and a second thread may service other data of an interface of the scatter network node. In some single-thread examples of the scattering application, the thread may progress through multiple hierarchical levels servicing certain data types before moving to a next lower level, if those data types are present. In some examples, the single-thread examples may have certain improvements in efficiency over the dual-thread implementations, such as by eliminating operations performed to facilitate the passing of data from one thread to another thread.

As used herein, the scatter network node may have multiple interfaces (physical or virtual), which each may have multiple channels. Different interfaces may include sockets, one or more WiFi interfaces, one or more physical interfaces, one or more long-term evolution (LTE) interfaces, one or more 5G wireless interfaces, one or more wireless local area network (WLAN) interfaces, one or more Ethernet interfaces, and/or one or more satellite wireless interfaces (wireless interfaces linking to satellites located in space—either low earth orbit (LEO) satellites, geosynchronous satellites, or other satellites). Different interfaces may also include Internet Protocol 6 Over Low-Power Wireless Personal Area Networks (6LoWPAN), Bluetooth Low Energy (BLE), global system for mobile communications (GSM), LoRa, LTE-M, LTE-MTC, Narrowband IoT (NB-IoT), near field communication (NFC), WiFi Direct, Z-Wave, and/or Zigbee wireless interfaces. Examples of data bands also include short message service (SMS), mobile subscriber identity module (SIM) management messages, such as unstructured supplementary service data (USSD) or USSD simulation service in IP multimedia subsystem (IMS) (USSI), etc.

Turning now to FIG. 1A, a communication system 10 is described. In an embodiment, the system 10 comprises a first scatter network node 12 that executes a first scattering application 13 and a second scatter network node 14 that executes a second scattering application 15. In an embodiment, the first scattering application 13 is a first instance and the second scattering application 15 is a second instance of the same scattering application. In another embodiment, however, the first scattering application 13 may be different from the second scattering application 15, for example the first scattering application 13 may be configured to play a client role while the second scattering application 15 may be configured to play a server role.

The first scatter network node 12 and the second scatter network node 14 may each be implemented as separate computer systems, for example, server computers. Computer systems are described further hereinafter. One or both of the scatter network nodes 12, 14 may be implemented as a smart phone, a wearable computer, a headset computer, a laptop computer, a tablet computer, a notebook computer, or an Internet of Things (IoT) device having at least some functionality of a computer. One of the scatter network nodes 12, 14 may be implemented as one or more virtual servers executing in a cloud computing environment.

The scattering applications 13, 15 comprise executable logic instructions that comprise scripts, compile high-level language code, assemble language instructions, and/or interpret language code. The scattering applications 13, 15 may be provided as shell scripts, compiled C language code, compiled C++ language code, JAVA code, and/or some other kind of logic instructions. In an embodiment, compiled C language code is used to implement the logic instructions of the scattering applications 13, 15 and provides access to operating system calls and greater control of the operations on the scatter network nodes 12, 14 than scripts may provide. The scattering applications 13, 15 may also comprise data such as configuration data and/or provisioning data, for example provisioning data that defines logical communication channels, associations of user devices to logical communication channels, instructions for forming encryption keys, such as asymmetric encryption keys, an ephemeral key, a private key, or the like, and instructions for performing a key exchange.

In an example, the first scatter network node 12 implements a WINDOWS operating system, and the first scattering application 13 may be configured for operation according to protocols, routines, or other criteria of a WINDOWS operating system. For example, the executable logic instructions of the scattering application 13 may be compatible with the WINDOWS operating system. In some examples, the second scatter network node 14 implements a WINDOWS operating system, and the second scattering application 15 may be configured for operation according to protocols, routines, or other criteria of a WINDOWS operating system. For example, the executable logic instructions of the scattering application 15 may be compatible with the WINDOWS operating system.

In an embodiment, the scatter network nodes 12, 14 collaborate with each other to establish a plurality of logical communication channels 16 by which they communicate with each other via a network 18. The network 18 may comprise one or more private networks, one or more public networks, or a combination thereof. In an embodiment, the network 18 comprises the Internet. FIG. 1A shows a first logical communication channel 16*a*, a second logical communication channel 16*b*, and a third logical communication channel 16*c*, but it is understood that the scatter network nodes 12, 14 may establish any number of logical communication channels 16, for example 2, 3, 4, 5, 6, 7, 8, 9, 10, 15, 16, 20, 25, 27, 30, 32, 64, 138, 256, 1024, 4096, or some other number of logical communication channels 16 less than 2 million logical communication channels.

Each logical communication channel 16 may comprise a data communication link that may be considered as an IP communication path. Each logical communication channel 16 is bidirectional such that data packets may flow from the first scatter network node 12 to the second scatter network node 14 via the logical communication channels 16, and data packets may flow from the second scatter network node 14 to the first scatter network node 12 via the logical communication channels 16. Each logical communication channel 16 may pass through various network nodes within the network 18, such as scatter relays. The data communication passing from the first scatter network node 12 to the second scatter network node 14 or vice versa from the second scatter network node 14 to the first scatter network node 12 is treated within the network 18 as IP datagrams.

In an embodiment, at least some communication between the first scatter network node 12 and the second scatter network node 14 is encrypted. For example, a data portion of an application datagram encapsulated in a data portion of the IP datagrams may be encrypted. For example, a data portion of an application datagram and selected parts of a header portion of the application datagram encapsulated in the data portion of the IP datagrams may be encrypted. In some embodiments, the encryption may cause the encrypted portions of the communication to take on a pseudorandom appearance such that the encrypted portions of the communication may be indistinguishable from random noise.

In an embodiment, the communication between the first scatter network node 12 and the second scatter network node 14 may be considered to flow over a VPN. In some contexts, the scatter network nodes 12, 14 may be said to establish a scatter network via the logical communication channels 16.

A first communication user device 20 may establish a first local communication link 21 with the first scatter network node 12. A second communication user device 22 may establish a second local communication link 23 with the second scatter network node 14. The communication user devices 20, 22 may desire to communicate with each other via an application layer link 24 that is implemented via the scatter network nodes 12, 14 that provide network layer communication links (IP datagram traffic) via the network 18. Note that the dotted line 24 indicates that the application layer link 24 is conceptual in nature and that the actual communication path between the communication user devices 20, 22 passes through the scatter network nodes 12, 14 and the network 18. The first and second local communication links 21, 23 may be insecure and may not carry encrypted data packets. For example, the IP datagrams sent by the first communication user device 20 may designate the true IP address of the first communication user device 20, and the IP datagrams sent by the second communication user device 22 may designate the true IP address of the second communication user device 22. It is undesirable to send IP datagrams that include the true IP addresses of communication user devices 20, 22 via the network 18 because an adversary system 26 may be sniffing or otherwise monitoring the data traffic in the network 18 and identify these user devices 20, 22. The scatter network nodes 12, 14 hide the true IP addresses of the communication user devices 20, 22.

To establish a communication link with a scatter node, a key exchange is performed between the scatter network nodes. The key exchange may be performed in-band (e.g., via the logical communication channels 16) or out of band (e.g., via first out of band link 30 and/or second out of band link 32). For example, the first scatter network node 12 may establish a first out of band link 30 with the second scatter network node 14. In some examples, the first scatter network node 12 may establish a second out of band link 32 with the second scatter network node 14. In other examples, the second scatter network node 14 may establish the second out of band link 32 with the first scatter network node 12. Although shown as outside the network 18, in some examples one or both of the first out of band link 30 and/or the second out of band link 32 may traverse the network 18 while remaining separate and distinct from the logical communication channels 16. In some examples, the adversary system 26 may be unaware of, or unable to monitor or intercept key exchange information performed via the first out of band link 30 and/or the second out of band link 32 between the first scatter network node 12 and the second scatter network node 14. However, even if the adversary system 26 intercepts the key exchange information performed via the first out of band link 30 and/or the second out of band link 32, because the key exchange information is performed out of band (e.g., not via the logical communication channels 16), the adversary system 26 may lack sufficient information to correlate that key exchange information to communication of the first scatter network node 12 or the second scatter network node 14 performed via the logical communication channels 16. In some examples, after first performing a key exchange between the first scatter network node 12 and the second scatter network node 14 out of band (e.g., via first out of band link 30 and/or second out of band link 32), subsequent key exchanges between the first scatter network node 12 and the second scatter network node 14 may be performed in-band (e.g., via the logical communication channels 16).

Figure 1B:
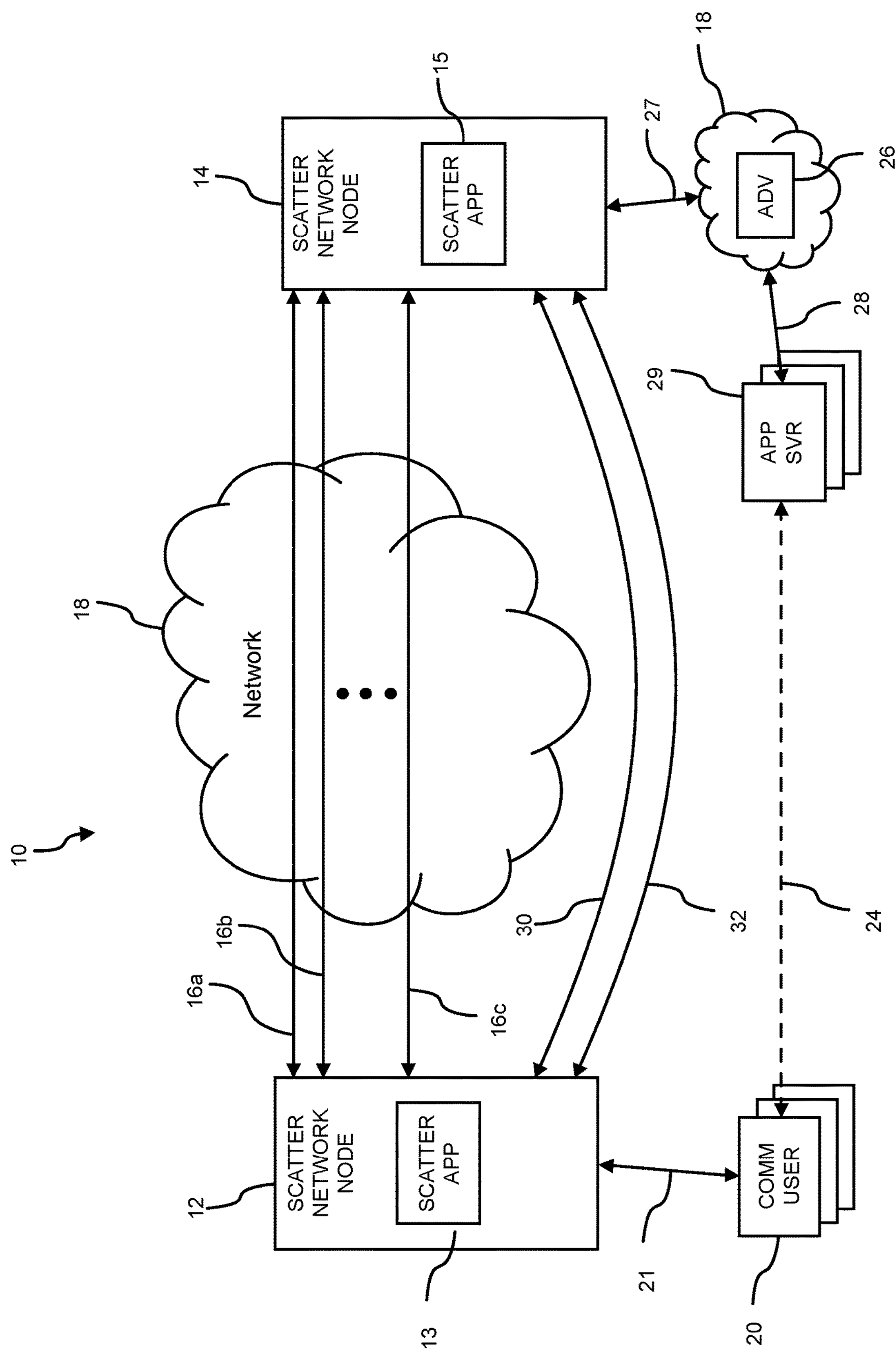
FIG. 1B is another block diagram of the communication system according to an embodiment of the disclosure.

Turning now to FIG. 1B, an alternate view of the communication system 10 is described. The communication functionality provided by the scatter network nodes 12, 14 is general and applies to other communication scenarios than that illustrated and described with reference to FIG. 1A. Note that the network 18 is shown as two cloud images in FIG. 1B but these two clouds conceptually refer to the same network. It is illustrated in FIG. 1B to facilitate understanding of flow of communications. In FIG. 1B, the communicating end users may be considered to be the first communication user device 20 and an application server 29. Thus, the first communication user device 20 may communicate with the application server 29 via an application layer communication link 24 that is conceptual in nature. The first communication user device 20 may request content from and receive content from the application server 29 or send content to the application server 29 conceptually over the application layer communication link 24 but in fact via the first communication link 21, via the logical communication channels 16, via a third communication link 27 to the network 18, and from the network 18 via a fourth communication link 28 to the application server 29. It will be appreciated that the network 18 through which the logical communication channels 16 route is the same network 18 through which the second scatter network node 14 communicates with the application server 29 via communication links 27, 28, drawn separately here to support further understanding of the system 10.

As illustrated in FIG. 1B, the adversary 26 may be located so as to monitor communication between the network 18 and the application server 29. The adversary 26 may determine the true IP addresses of a communication port of the second scatter network node 14 and a communication port of the application server 29. Importantly, however, the adversary 26 is not able to determine the true IP address of the first scatter network node 12 or of the first communication user device 20, hence the adversary 26 is not readily able to determine an approximate location of the first communication user device 20 and/or of the first scatter network node 12.

With reference now to both FIG. 1A and FIG. 1B, the first logical communication channel 16*a* may be considered to be defined by an IP address and port number at the first scatter network node 12 and an IP address and port number at the second scatter network node 14. The term port number or port numbers refers to a transport communication layer port number or transport communication layer port numbers and may include well-known port numbers, such as Transmission Communication Protocol (TCP) port numbers or User Datagram Protocol (UDP) port numbers. In an embodiment, the first scatter network node 12 and/or the first scattering application 13 may define sockets or interfaces to establish the communication ports at its end of the logical communication channels 16, and the second scatter network node 14 and/or the second scattering application 15 may define coordinate sockets or interfaces to establish the communication ports at its end of the logical communication channels 16. Sockets are a well-known communication abstraction used for conducting data communication between computer systems over the Internet. In an embodiment, the sockets may be UDP type sockets. In an embodiment, the sockets may be TCP type sockets. In an embodiment, a different intermachine communication abstraction may be used to implement the logical communication channels 16.

The first logical communication channel 16*a* is bidirectional: in a first communication event, the first scatter network node 12 may send an IP datagram via the first logical communication channel 16*a* to the second scatter network node 14 via the network 18, while in a second communication event, the second scatter network node 14 may send an IP datagram via the first logical communication channel 16*a* to the first scatter network node 12 via the network 18. The different logical communication channels 16 connect to the first scatter network node 12 at different combinations of IP address, protocol, and port. For example, the first logical communication channel 16*a* may connect to the first scatter network node 12 at a first IP address and first port number; the second logical communication channel 16*b* may connect to the first scatter network node 12 at a second IP address and the first port number; and the third logical communication channel 16*c* may connect to the first scatter network node 12 at a third IP address and the first port number.

Alternatively, the first logical communication channel 16*a* may connect to the first scatter network node 12 at a first IP address and first port number; the second logical communication channel 16*b* may connect to the first scatter network node 12 at the first IP address and a second port number; and the third logical communication channel 16*c* may connect to the first scatter network node 12 at the first IP address and a third port number. Alternatively, the first logical communication channel 16*a* may connect to the first scatter network node 12 at a first IP address and first port number; the second logical communication channel 16*b* may connect to the first scatter network node 12 at a second IP address and the first port number; and the third logical communication channel 16*c* may connect to the first scatter network node 12 at a third IP address and a second port number. The logical communication channels 16 may attach to the second scatter network node 14 by other combinations of IP address/port number pairs, IP protocols, or the like.

It is noted that a logical communication channel 16 may be defined by any unique combination of: (A) an IP address associated with the first scatter network node 12, (B) a port number at the first scatter network node 12, (C) an IP address associated with the second scatter network node 14, (D) a port number at the second scatter network node 14, and (E) the IP protocol used between the first scatter network node 12 and the second scatter network node 14. Thus, the first logical channel 16*a* could be defined by a first IP address associated with the first scatter network node 12, a first port number at the first scatter network node 12, a second IP address associated with the second scatter network node 14, and a second port number at the second scatter network node 14; the second logical channel 16*b* could be defined by the first IP address associated with the first scatter network node 12, the first port number at the first scatter network node 12, a third IP address associated with the second scatter network node 14, and the second port number at the second scatter network node 14; and the third logical channel 16*c* could be defined by the first IP address associated with the first scatter network node 12, the first port number at the first scatter network node 12, the second IP address associated with the second scatter network node 14, and a third port number at the second scatter network node 14. These are examples of unique IP addresses and port numbers that uniquely define logical communication channels 16, but it is understood there are many alternative combinations.

The first out of band link 30 and/or second out of band link 32 may be implemented via separate physical interfaces than other logical communication channels or communication links of the communication system 10. For example, the first out of band link 30 and second out of band link 32 are separate and distinct from the logical communication channels 16. As described above, some examples of physical interfaces include WiFi physical interfaces, Bluetooth physical interfaces, LTE physical interfaces, 5G wireless physical interfaces, WLAN physical interfaces, Ethernet physical interfaces, and/or satellite wireless physical interfaces (wireless interfaces linking to satellites located in space—either LEO satellites, geosynchronous satellites, or other satellites). Different physical interfaces may also include LoWPAN, BLE, GSM, LoRa, LTE-M, LTE-MTC, NB-IoT, NFC, WiFi Direct, Z-Wave, and/or Zigbee wireless physical interfaces. Examples of data bands, or communication protocols that may be utilized in performing out of band key exchange via one or more of the above physical interfaces, include SMS, mobile SIM management messages, such as USSD or USSI, etc. In some embodiments, one or more of the first out of band link 30 and/or second out of band link 32 are implemented via a same physical interface and/or same data band or communication protocol. In other examples, one or more of the first out of band link 30 and/or second out of band link 32 are implemented via different physical interfaces and/or data bands or communication protocols. Additionally, in some examples, the second out of band link 32 does not exist.

In some embodiments, communication via the first out of band link 30 and/or second out of band link 32 may be encrypted via a first encryption type and communication via other logical communication channels, such as the logical communication channels 16, or communication links of the communication system 10 may be encrypted via a second encryption type. A component that receives communication may be dedicated to a particular encryption type. For example, an application (such as the key exchange application 31 or the key exchange application 33) or scatter network node may decrypt and encrypt communication transported via out of band links via asynchronous encryption and may decrypt and encrypt communication transported via other logical communication channels or communication links of the communication system 10 via synchronous encryption.

Figure 2:
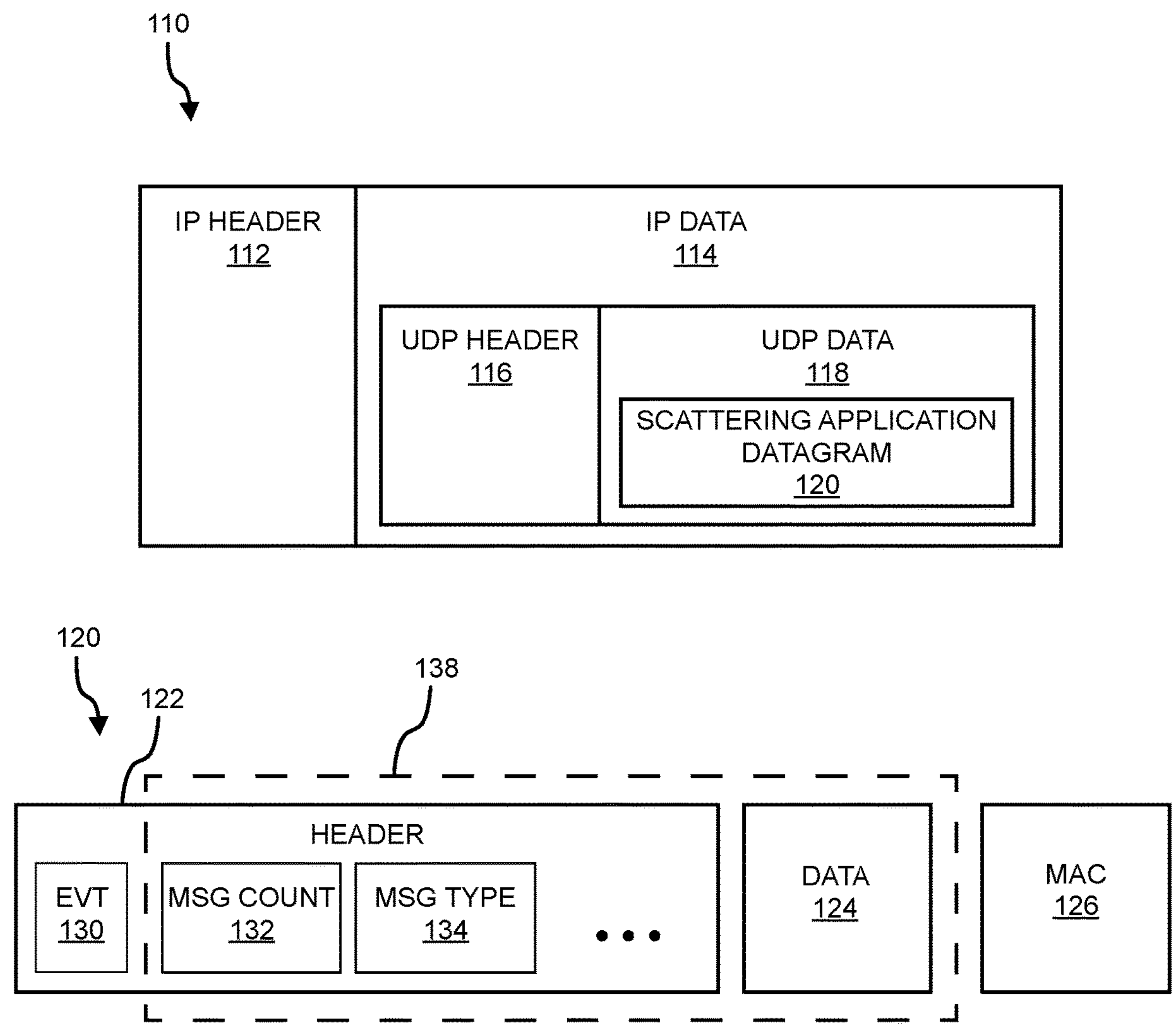
FIG. 2 is a block diagram of a scattering application datagram according to an embodiment of the disclosure.

Turning now to FIG. 2, a scattering application datagram 120 is described. In an embodiment, the messages exchanged by scatter network nodes 12, 14 each comprise a scattering application datagram 120. In an embodiment, the scattering application datagram 120 is encapsulated as a UDP data portion 118 of a UDP datagram that also comprises a UDP header 116. The UDP datagram itself is encapsulated in an IP data portion 114 of an IP datagram 110 that also comprises an IP header 112. In another embodiment, the scattering application datagram 120 may be encapsulated in a TCP data portion in a TCP segment, and the TCP segment may be encapsulated in the IP data portion 114 of the IP datagram 110.

In an embodiment, the scattering application datagram 120 comprises a scattering application datagram header 122, a scattering application datagram data portion 124, and a scattering application datagram message authentication code (MAC) 126. Note that the scattering application datagram data portion 124 may be called the scattering application datagram payload, that the UDP data portion 118 may be called the UDP payload, and the IP data portion 114 may be referred to as the IP payload in some contexts. In like manner, a TCP data portion may be referred to as a TCP payload in an embodiment where the TCP transport layer protocol is used instead of the UDP transport layer protocol. In an embodiment, the scattering application datagram header 122 comprises an endpoint validation token (EVT) 130, a message count 132, and a message type 134. It is understood that the scattering application datagram header 122 may comprise additional parameters, for example parameters that contain metadata about the scattering application datagram 120 or the logical communication channels 16.

The scattering application datagram data portion 124 comprises the actual data content that is to be conveyed between the communication user devices 20, 22 or between the first communication user device 20 and the application server 29. In an embodiment, a portion of the scattering application datagram header 122 and all of the scattering application datagram data portion 124 are encrypted in an encrypted portion 138. In some embodiments, the encrypted portion 138 is encrypted so as to appear indistinguishable from random noise. In other examples, the scattering application datagram 120 may be encrypted so as to appear indistinguishable from random noise. In some examples, the encrypted portion 138, such as the scattering application datagram data portion 124, may be padded by dummy data to reach a programmed data length, for example, to obfuscate the true nature of the encrypted portion 138, scattering application datagram header 122, the scattering application datagram data portion 124, and/or the scattering application datagram 120. In an embodiment, the message count 132 and the message type 134 parameters of the scattering application datagram header 122 as well as the scattering application datagram data portion 124 are encrypted. It is understood that the positional order of parameters in the scattering application header 122 may be different in different embodiments, although it may be preferred that EVT 130 be at the front of the scattering application datagram header 122, separate from the encrypted portion 138 of the scattering application datagram 120. In other examples, the EVT 130 may instead be at the end of the scattering application datagram header 122, at some programmed location between the front and the end of the scattering application datagram header 122, or any other suitable location in the scattering application datagram 120.

The EVT 130 uniquely identifies a device (e.g., the scattering network nodes 12, 14) that sends a given scattering application datagram 120 on a logical communication channel 16. The EVT 130 permits the counterpart (e.g., receiving) device to look-up an appropriate decryption key stored in a transitory memory (e.g., random access memory (RAM)) of the counterpart device and decrypt the encrypted portion 138. The scattering application datagram MAC 126 provides a cryptographic checksum that can be used by the counterpart device to determine if the scattering application datagram 120 has been altered. The scattering application datagram MAC 126 may be calculated as a kind of hash or checksum calculated over the encrypted portion 138 based in part on using the selected encryption key. If the scattering application datagram MAC 126 does not match the MAC calculated by the scattering application 13, 15, the entire scattering application datagram 120 may be discarded as corrupted. In this case, the scattering application 13, 15 does not decrypt the encrypted portion 138. The scattering application datagram MAC 126 may be at least 6 bytes long, at least 8 bytes long, at least 10 bytes long, at least 12 bytes long, at least 14 bytes long, at least 16 bytes long, at least 18 bytes long, at least 20 bytes long, at least 22 bytes long, at least 24 bytes long and less than 129 bytes long.

The message count 132 is a count of scattering application datagrams 120 sent by a device to a given counterpart device. While shown in FIG. 2 as included in the encrypted portion 138, in some examples the encrypted portion 138 does not include the message count 132, in which case the message count 132 may be unencrypted or may be encrypted separately from the encrypted portion 138. The scattering application 13, 15 may keep a local count value as it sends scattering application datagrams 120 and build this into the message count 132. In an embodiment, the message count 132 may be 4 bytes, 5 bytes, 6 bytes, 7 bytes, 8 bytes, 9 bytes, 10 bytes, 12 bytes, or some other number of bytes less than 24 bytes. As discussed further herein after, the receiving scattering application 13, 15 may use the message count to reorder, re-duplicate, or both, received messages carried in the data portion 124 of the scattering application datagram 120 before forwarding on to the communication user device 20, 22 or to the application server 29. The message type 134 may indicate a type of the message carried in the data portion 124 of the scattering application datagram 120. The message type 134 may indicate that the message is an encryption key rotate command, is a data message (e.g., data relevant to the communication user devices 20, 22 or to the application server 29), or some other type of message.

The scattering applications 13, 15 are preconfigured to associate traffic on the logical communication channels 16 with the communication user devices 20, 22. For example, the first scattering application 13 is preconfigured to associate IP datagrams received on logical communication channels 16 to the first communication user device 20 (e.g., to the true IP address of the first communication user device 20) and to associate IP datagrams addressed to the true IP address of the second communication user device 22 to the logical communication channels 16. For example, the second scattering application 15 is preconfigured to associate IP datagrams received on the logical communication channels 16 to the second communication user device 22 (e.g., to the true IP address of the second communication user device 22) and to associate IP datagrams addressed to the true IP address of the first communication user device 20 to the logical communication channels 16. In other words, the communication user devices 20, 22 communicate in terms of their own true IP addresses, but the scatter network nodes 12, 14 hide these true IP addresses from the network 18 by means of the logical communication channels 16 which do not use the true IP addresses of the communication user devices 20, 22.

The first scatter network node 12 and the second scatter network node 14 may provide a plurality of different physical interfaces which are used to implement the logical communication channels 16, first out of band link 30 and/or second out of band link 32. These different physical interfaces may comprise one or more Ethernet physical interfaces, one or more WLAN physical interfaces, one or more wireless wide area network (WWAN) physical interfaces, and one or more satellite communication physical interfaces. The WLAN physical interfaces may comprise a WiFi physical interface and/or a Bluetooth physical interface. The WWAN physical interfaces may comprise a 6G wireless telecommunication protocol physical interface, a 5G wireless telecommunication protocol physical interface, a LTE wireless telecommunication protocol physical interface, a code division multiple access (CDMA) wireless telecommunication protocol physical interface, and/or a GSM wireless telecommunication protocol physical interface. Different physical interfaces may include 6LoWPAN, Bluetooth, BLE, GSM, LoRa, LTE, LTE-M, LTE-MTC, NB-IoT, NFC, WiFi Direct, Z-Wave, and/or Zigbee wireless physical interfaces. The satellite communication physical interface may comprise an Ethernet-to-satellite physical interface (e.g., a dongle device that uses an Ethernet connector to couple to a computer system and acts as a satellite wireless base station). The physical interfaces provided by the first scatter network node 12 may be different from the physical interfaces provided by the second scatter network node 14. By employing different physical interfaces to implement the logical communication channels 16, channel diversity may be increased and may help to further thwart attempts by the adversary system 26 to eavesdrop or monitor communications between the communication user devices 20, 22. Further, by using different physical interfaces to implement the logical communication channels in comparison to the first out of band link 30 and/or second out of band link 32, computational efficiency is increased resulting from a physical interface employing only one of symmetric encryption or asymmetric encryption and security is enhanced by separating key-exchange information from subsequent data transport, or authenticated message, transmission.

In an embodiment, the scattering applications 13, 15 provide VPN communication functionality over the logical communication channels 16. Unlike some VPN off-the-shelf tools, the VPN communication functionality provided by the scattering applications 13, 15 does not indicate the functionality in their headers. For example, some off-the-shelf VPN tools provide an indication in their headers that a message may be a set-up type of VPN data packet, a key exchange type of VPN data packet, and user data type of VPN data packets. It is undesirable to "tip the hand" of the VPN communication traffic, as this may give an advantage to the adversary system 26, for example allowing them to focus their effort on trying to extract encryption keys from the key exchange type of VPN data packets.

Accordingly, in some embodiments a portion of the scattering application datagram header 122 and all of the scattering application datagram data portion 124 are encrypted as encrypted portion 138 to appear indistinguishable from random noise. In other examples, the scattering application datagram 120 may appear indistinguishable from random noise. In some examples, the scattering application datagram 120, including the encrypted portion 138, may be configured to mimic other types of netflow data traffic, or other data objects. In this way, the scattering application datagram 120 may blend in with other network communication traffic without tipping the hand or otherwise raising warnings that the scattering application datagram 120 is encrypted or is an element of VPN communication traffic.

Figure 3:
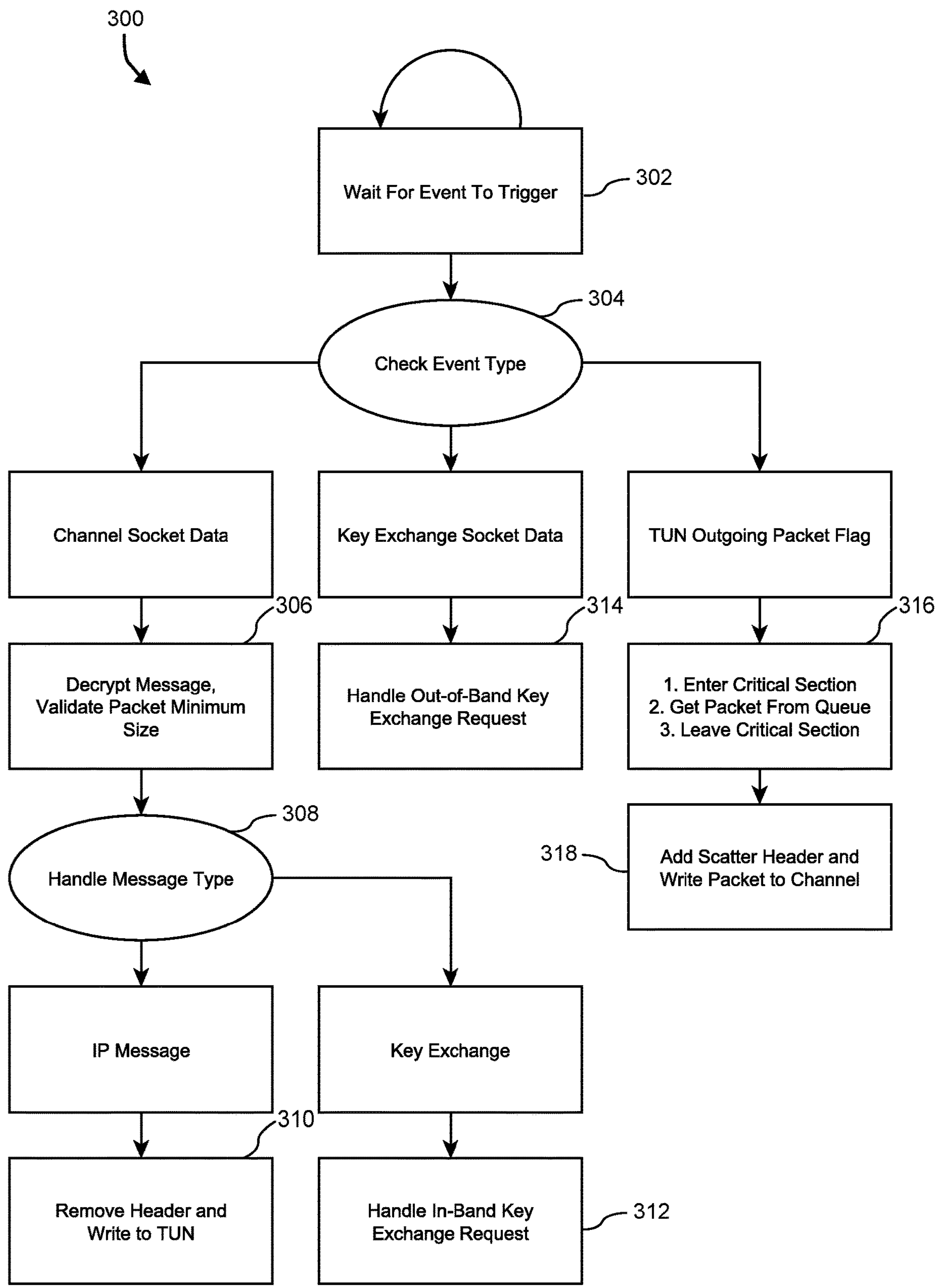
FIG. 3 is a flow chart of a method according to an embodiment of the disclosure.

Turning now to FIG. 3, a method 300 is described. In some examples, the method 300 is a method of servicing a received scattering application datagram 120 according to a multi-thread (e.g., dual-thread) approach. In some examples, the method 300 may be implemented by the first scatter network node 12 and/or the second scatter network node 14, such as by a scattering application. For example, the first scatter network node 12 may implement the method 300 to facilitate communication with the second scatter network node 14. Similarly, the second scatter network node 14 may implement the method 300 to facilitate communication with the first scatter network node 12. In an example, the first scatter network node 12 may implement the method 300 via the first scattering application 13, and the second scatter network node 14 may implement the method 300 via the second scattering application 15.

At operation 302, in a first thread, the scattering application waits for a trigger event to occur. In some examples, the trigger event is the receipt of socket data, such as by the first scatter network node 12 from the second scatter network node 14. In other examples, the trigger event is the setting or assertion of a network tunnel (TUN) packet ready flag. The scattering application may monitor any number of sockets (e.g., one or more) for the occurrence of a trigger event. The method 300 may continuously wait and/or monitor for a trigger event to occur. Responsive to the occurrence of a trigger event, the method 300 proceeds to operation 304 while continuing at operation 302 to wait for a trigger event to occur.

At operation 304, responsive to the occurrence of a trigger event, the scattering application determines an event type of the trigger event. In some examples, the trigger event sets a flag or data variable that indicates the event type. In such examples, the scattering application may determine the event type by analyzing the flag and or data variable. For example, the event type may be channel socket data (e.g., channel data received at a socket), key exchange socket data (e.g., key exchange data received at a socket), or detecting a set TUN packet ready flag.

At operation 306, responsive to determining that the event type is the receipt of channel socket data, the scattering application decrypts the channel socket data to obtain a data packet and validates the channel socket data. For example, the scattering application may validate the channel socket data by determining that a packet length of the data packet of the channel socket data is greater than a minimum packet size.

At operation 308, responsive to validating the channel socket data, the scattering application processes the data packet. In an example, at operation 310, responsive to the data packet including an IP message, the scattering application removes a header from the data packet to obtain the IP message and writes the IP message to the TUN. For example, the scattering application writes the IP message to the TUN to pass the IP message to another application, process, or device for servicing. For example, the scattering application writes the IP message to the TUN to pass the channel data from the first scatter network device 12 to the first communication user device 20. In an example, the TUN is a virtual network interface for a device to which an application can read/write IP packets. The TUN simulates a network layer device, operating at layer 3 of the network protocol stack such that the TUN is compatible with IP packets.

In another example, at operation 312, responsive to the data packet being a key exchange packet (e.g., a key exchange request or a key exchange response), the scattering application processes the key exchange packet to perform an in-band key exchange.

Returning to operation 304, responsive to determining that the event type is the receipt of a key exchange packet (e.g., a key exchange request or a key exchange response), at operation 314, the scattering application processes the key exchange packet to perform an out-of-band key exchange. In various examples, the out-of-band key exchange may be performed according to any suitable process, such as described in U.S. patent application Ser. No. 18/345,819, filed Jun. 30, 2023, titled "Out of Band Key Exchange" by John G. Andrews, et al., which is incorporated herein by reference in its entirety.

Returning to operation 304, responsive to determining that the event type is detecting a set TUN packet ready flag (e.g., the TUN packet ready flag having a value of logic 1), at operation 316 the scattering application services TUN data from a shared resource. The shared resource is, for example, a queue or other data storage structure to which multiple threads have access. In some examples, to service the TUN data, the scattering application locks the shared resource to prevent changes. In some examples, such as in a WINDOWS operating environment, to lock the shared resource against changes, the scattering application enters a Critical Section. In some examples, the Critical Section facilitates synchronization between threads by locking access to a shared resource to only one thread while in the Critical Section. In this way, the one thread is prevented from modifying the shared resource while another thread is accessing the shared resource. After locking the shared resource, the scattering application retrieves the content of the shared resource (e.g., data packet(s) stored in the queue) and exits the Critical Section. Exiting the Critical Section releases the shared resource for modification by other threads. In some examples, responsive to exiting the Critical Section, the scattering application resets the TUN packet ready flag, such as to deasserted value or value of logic 0.

At operation 318, the scattering application processes the retrieved data packet(s). In some examples, processing the data packet(s) includes packaging or encapsulating the data packet(s) according to a communication format of the scattering application. The encapsulating may include adding or writing a scatter header or other data to the data packet(s), such as data described above with respect to the IP datagram 110 and/or the scattering application datagram 120. In some examples, processing the data packet(s) further includes encrypting the data packet(s) after the addition of the scatter header or other data. Subsequent to processing the data packet(s), the scattering application writes the processed data packet(s) as outgoing data to a channel of socket, such as for transmission by the first scatter network node 12 to the second scatter network node 14.

Figure 4:
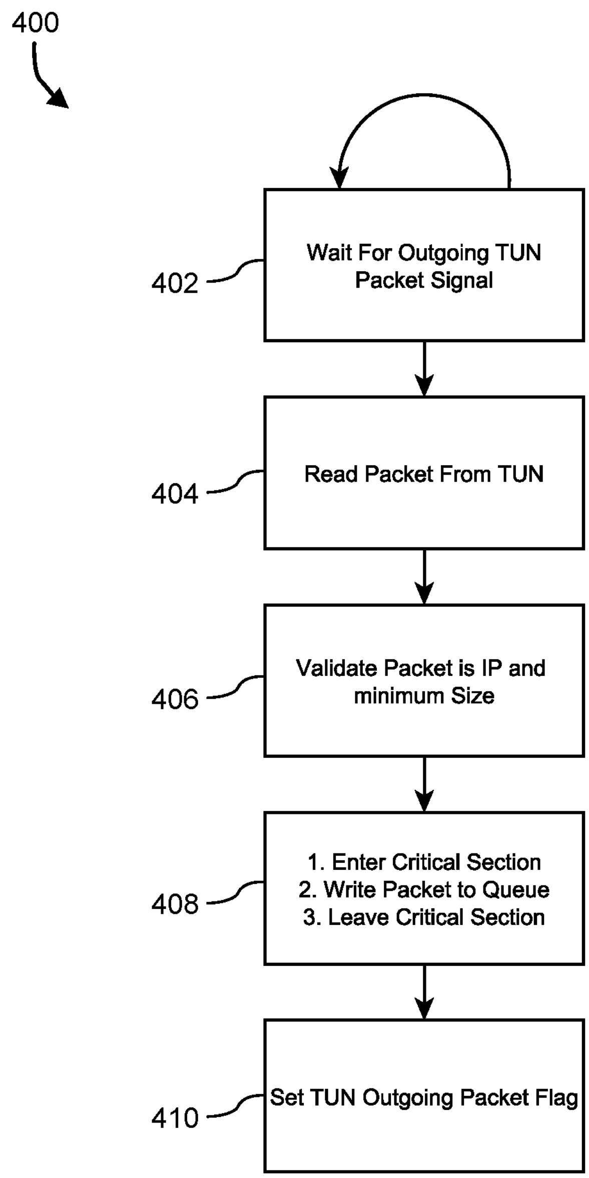
FIG. 4 is a flow chart of a method according to an embodiment of the disclosure.

Turning now to FIG. 4, a method 400 is described. In some examples, the method 400 is a method of processing TUN data according to a multi-thread (e.g., dual-thread) approach. In some examples, the method 400 may be implemented by the first scatter network node 12 and/or the second scatter network node 14, such as by a scattering application. For example, the first scatter network node 12 may implement the method 400 to facilitate communication with the second scatter network node 14. Similarly, the second scatter network node 14 may implement the method 400 to facilitate communication with the first scatter network node 12. In an example, the first scatter network node 12 may implement the method 400 via the first scattering application 13, and the second scatter network node 14 may implement the method 400 via the second scattering application 15. In an example, the method 400 may be complimentary and/or supplementary to the method 300. For example, the method 300 may operate in a first thread of execution and the method 400 may operate in a second thread of execution.

At operation 402, in a second thread, the scattering application waits for receipt of an outgoing TUN packet signal. In some examples, occurrence of the outgoing TUN packet signal indicates that data has been written to the TUN, such as to pass the data to another application, process, or device for servicing. For example, the data may be written to the TUN by any suitable process, such as by the first communication user device 20, to enable the scattering application to read the data and pass the data from the first scatter network node 12 to the second scatter network node 14. The method 400 may continuously wait and/or monitor for receipt of an outgoing TUN packet signal. Responsive to the occurrence of a trigger event, the method 400 proceeds to operation 404 while continuing at operation 402 to wait for a trigger event to occur.

At operation 404, in the second thread, responsive to determining that outgoing TUN data exists (such as via the outgoing TUN packet signal), the scattering application reads data from the TUN. For example, the scattering application reads a data packet from the TUN.

At operation 406, in the second thread, the scattering application validates the read data packet. For example, the scattering application may determine a type of the data packet (e.g., IPv4, IPvv6, etc.), determine that a size of the data packet is greater than at least a programmed minimum length or size, and/or determine that the size of the data packet is less than a programmed maximum length or size.

At operation 408, in the second thread, responsive to determining the data packet read from the TUN is valid, the scattering application locks the shared resource to prevent changes. In some examples, to lock the shared resource against changes, the scattering application enters a Critical Section, as described above. After locking the shared resource, the scattering application writes the data packet to the shared resource and exits the Critical Section. Exiting the Critical Section releases the shared resource for modification by other threads.

At operation 410, in the second thread, responsive to exiting the Critical Section, the scattering application sets the TUN packet ready flag, such as to an asserted value or value of logic 1. In some examples, setting the TUN packet ready flag at operation 410 in the second thread notifies the first thread of the data packet written to the queue and facilitates the first thread retrieving the data packet written in the second thread to the queue.

Figure 5:
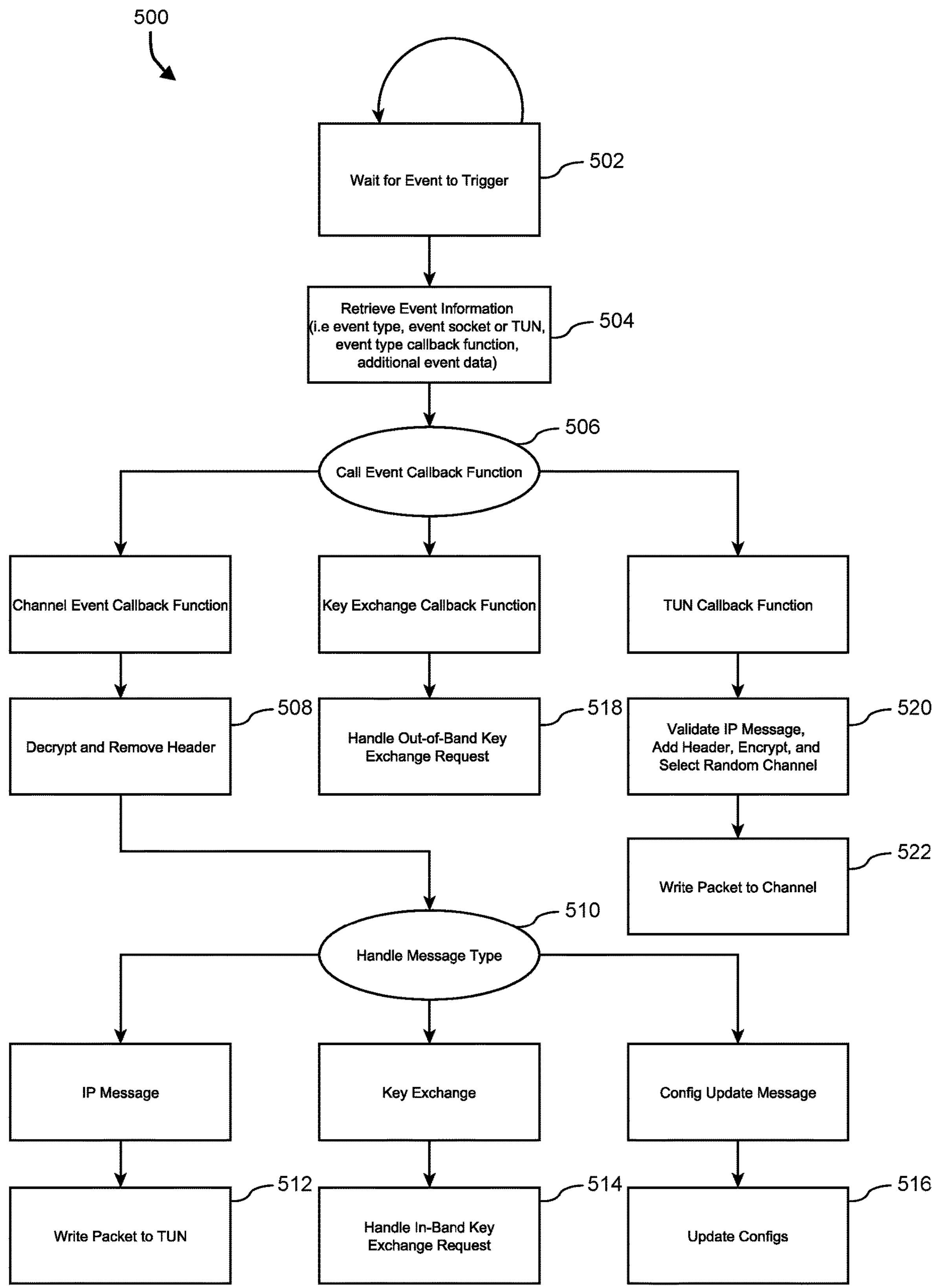
FIG. 5 is a flow chart of a method according to an embodiment of the disclosure.

Turning now to FIG. 5, a method 500 is described. In some examples, the method 500 is a method of servicing a received scattering application datagram 120 according to a single-thread approach. In some examples, the method 500 may be implemented by the first scatter network node 12 and/or the second scatter network node 14. For example, the first scatter network node 12 may implement the method 500 to facilitate communication with the second scatter network node 14. Similarly, the second scatter network node 14 may implement the method 500 to facilitate communication with the first scatter network node 12. In an example, the first scatter network node 12 may implement the method 500 via the first scattering application 13, and the second scatter network node 14 may implement the method 500 via the second scattering application 15.

At operation 502, the scattering application waits for a trigger event to occur. In some examples, the trigger event is a socket event. In other examples, the event is a TUN event. The scattering application may monitor any number of sockets (e.g., one or more) and/or TUN instances for the occurrence of a trigger event. The method 500 may continuously wait and/or monitor for a trigger event to occur. Responsive to the occurrence of a trigger event, the method 500 proceeds to operation 504 while continuing at operation 502 to wait for a trigger event to occur.

At operation 504, the scattering application retrieves event information for an occurrence of a trigger event. In some examples, responsive to the occurrence of the trigger event, the event information corresponding to the trigger event is written to a data structure for subsequent use. In such example, retrieving the event information may include reading from a data structure corresponding to the trigger event. For example, the event information may include an event type, a socket or TUN from which the event arises, an event type callback function, and/or any other suitable information or data about the event.

At operation 506, the scattering application calls an event callback function associated with the occurrence of the trigger event. For example, the event callback function may be a channel event callback function responsive to receipt of channel socket data, a key exchange callback function responsive to receipt of key exchange socket data, or a TUN callback function responsive to receipt of outgoing TUN data, and these callback functions may be implemented according to any suitable process, such as those described for scattering network communications, as described above herein and through incorporated reference.

At operation 508, responsive to calling the channel event callback function, the scattering application decrypts the channel socket data to obtain a data packet, removes a header from the data packet, and validates the data packet. For example, the scattering application may validate the data packet by determining that a packet length of the data packet is greater than a minimum packet size.

At operation 510, responsive to validating the data packet, the scattering application processes the data packet. In an example, at operation 512, responsive to the data packet including an IP message, the scattering application writes the IP message to the TUN. For example, the scattering application writes the IP message to the TUN to pass the IP message to another application, process, or device for servicing. For example, the scattering application writes the IP message to the TUN to pass the channel data from the first scatter network device 12 to the first communication user device 20. In an example, the TUN is a virtual network interface for a device to which an application can read/write IP packets. The TUN simulates a network layer device, operating at layer 3 of the network protocol stack such that the TUN is compatible with IP packets.

In another example, at operation 514, responsive to the data packet being a key exchange packet (e.g., a key exchange request or a key exchange response), the scattering application processes the key exchange packet to perform an in-band key exchange. For example, based on the key exchange packet, the scattering application performs a key exchange to establish a cryptographic shared secret.

In another example, at operation 516, responsive to the data packet being a configuration update message, the scattering application processes the configuration update message to update one or more configurations of the scattering application. In various examples, the configurations, or configuration parameters of the configurations, may include a TUN virtual network device name, an IP mask of the TUN virtual network device, such as in Classless Inter-Domain Routing (CIDR) notation, a maximum transmission unit (MTU) of the first scatter network node 12 and/or the second scatter network node 14, or any other suitable data useful in configuration of the scattering application, first scatter network node 12, and/or the second scatter network node 14.

Returning to operation 506, responsive to calling the key exchange callback function, at operation 518 the scattering application processes the key exchange socket data to perform a key exchange to establish a cryptographic shared secret. In various examples, the key exchange may be an out-of-band key exchange, or an in-band key exchange. In various examples, the out-of-band key exchange may be performed according to any suitable process, such as described above herein and through incorporated reference.

Returning to operation 506, responsive to calling the TUN callback function, at operation 520 the scattering application processes the outgoing TUN data. For example, the scattering application may validate a data packet of the TUN data. The scattering application may determine a type of the data packet (e.g., IPv4, IPvv6, etc.), determine that a size of the data packet is greater than at least a programmed minimum length or size, and/or determine that the size of the data packet is less than a programmed maximum length or size. The scattering application may further process the TUN data. In some examples, processing the TUN data includes packaging or encapsulating the TUN data according to a communication format of the scattering application. The encapsulating may include adding or writing a scatter header or other data to the TUN data, such as data described above with respect to the IP datagram 110 and/or the scattering application datagram 120. In some examples, processing the TUN data further includes encrypting the TUN data after the addition of the scatter header or other data.

At operation 522, the scattering application writes the processed TUN data as outgoing data to a channel of socket, such as for transmission by the first scatter network node 12 to the second scatter network node 14.

In some examples, the method 500 includes certain operational improvements over the methods 300 and 400. For example, the method 500 is a single-thread approach. As a result, the method 500 consumes fewer resources in operation, does not include thread synchronization, and does not include operations of writing to and reading from a shared resource to pass data between threads. As a result, the method 500 may be faster in operation than the methods 300 and 400, while also consuming less power than the methods 300 and 400.

Figure 6:
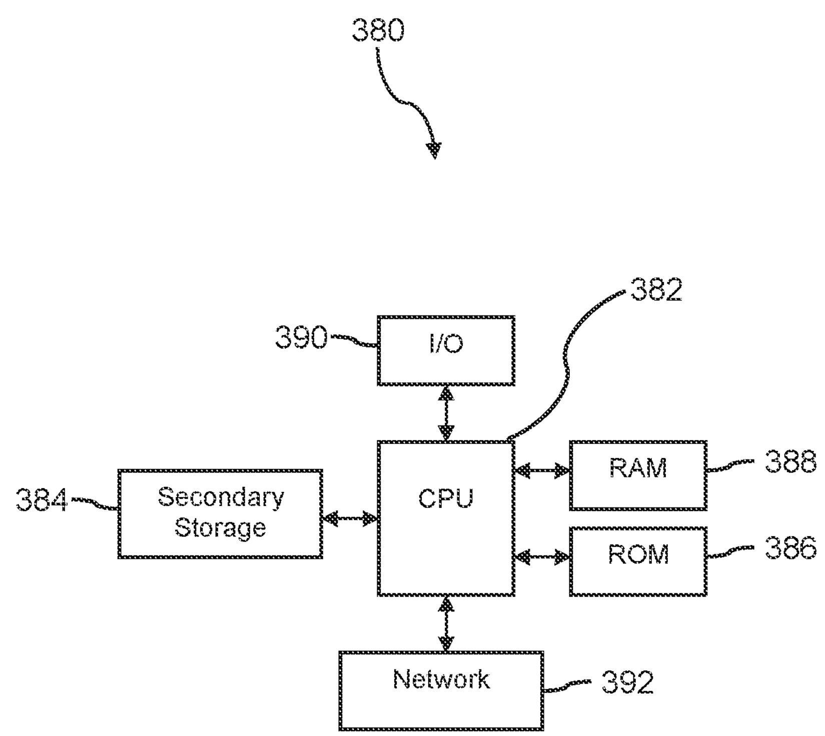
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, RAM 388, input/output (I/O) devices 390, and network connectivity devices 392. The processor 382 may be implemented as one or more CPU chips and/or may me a multi-core processor.

By programming and/or loading executable instructions onto the computer system 380, at least one of the CPU 382, the RAM 388, and the ROM 386 are changed, transforming the computer system 380 in part into a particular machine or apparatus having the functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions which comprise the application. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that comprise the application. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the functionality taught by the present disclosure. When the CPU 382 is configured in this way by the application, the CPU 382 becomes a specific purpose computer or a specific purpose machine.

The secondary storage 384 typically comprises one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may be referred to as physical interfaces or physical network interfaces. The network connectivity devices 392 may take the form of modems, modem banks, Ethernet cards, universal serial bus (USB) interface cards, serial interfaces, token ring cards, fiber distributed data interface (FDDI) cards, WLAN cards such as a WiFi physical interface, radio transceiver cards such as a WWAN (e.g., a cellular network physical interface), and/or other network devices. A network connectivity device 392 may comprise an Ethernet-to-satellite wireless link physical interface. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as CDMA, GSM, LTE, WiFi (IEEE 802.11), Bluetooth, Zigbee, NB IoT, NFC, RFID. The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and transmitted to the network, for example, in the form of a computer data baseband signal or signal embodied in a carrier wave. The baseband signal or signal embedded in the carrier wave, or other types of signals currently used or hereafter developed, may be generated according to any suitable methods. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk-based systems may all be considered secondary storage 384), flash drive, ROM 386, RAM 388, or the network connectivity devices 392. While only one processor 382 is shown, multiple processors or processor cores may be present. Thus, while instructions may be discussed as executed by a processor, the instructions may be executed simultaneously, serially, or otherwise executed by one or multiple processors or processor cores. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid-state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A scatter network device, comprising:

a non-transitory memory;

at least one processor; and a scattering application stored in the non-transitory memory that, when executed by the at least one processor:

monitors a socket for the presence of data;

monitors for an occurrence of a trigger event, the trigger event selected from among the receipt of data at the socket or setting of a network tunnel (TUN) packet ready flag;

responsive to detecting receipt of the data at the socket, determines a type of the data;

responsive to determining the type of the data, services the data; and responsive to not detecting data at the socket and detecting the setting of the TUN packet ready flag, services the TUN data.

2. The scatter network device of claim 1, the scattering application performs the monitoring, detecting, and servicing in a single thread of execution.

3. The scatter network device of claim 1, wherein determining the type of data includes determining that the data is key exchange data.

4. The scatter network device of claim 3, wherein servicing the data includes performing an in-band key exchange via the socket.

5. The scatter network device of claim 1, wherein determining the type of data includes determining that the data is channel data.

6. The scatter network device of claim 5, wherein servicing the data includes decrypting the data and removing a header from the data.

7. The scatter network device of claim 1, wherein responsive to detecting data at the socket and determining that the data is not key exchange data or channel data, the scattering application monitors for TUN data.

8. The scatter network device of claim 1, wherein servicing the TUN data includes validating the TUN data, adding a header to the TUN data, and encrypting the TUN data with the header.

9. The scatter network device of claim 1, wherein the scatter network device implements a WINDOWS operating system in which the scattering application executes.

10. A method of secure data routing in a single thread of execution, comprising:

monitoring a socket for the presence of data;

monitoring for an occurrence of a trigger event, the trigger event selected from among the receipt of data at the socket or setting of a network tunnel (TUN) packet ready flag;

responsive to detecting receipt of the data at the socket, determining a type of the data;

responsive to determining the data is key exchange data, servicing the key exchange data;

responsive to determining the data is channel data, servicing the channel data; and responsive to determining that the data received at the sock is neither key exchange data nor channel data and detecting the setting of the TUN packet ready flag, servicing the TUN data.

11. The method of claim 10, wherein servicing the key exchange data includes performing an in-band key exchange according to the key exchange data to establish a cryptographic shared secret.

12. The method of claim 10, wherein servicing the channel data includes decrypting the channel data and removing a header from the data.

13. The method of claim 10, wherein servicing the TUN data includes validating the TUN data, adding a header to the TUN data, and encrypting the TUN data with the header.

14. The method of claim 10, further comprising, responsive to determining that data is not present at the socket, monitoring for TUN data.

15. A computing device, comprising:

a non-transitory memory;

at least one processor; and a scattering application stored in the non-transitory memory that, when executed by the at least one processor:

in a first thread of execution:

monitors a socket for the presence of data;

responsive to detecting data at the socket, determine a type of the data;

responsive to determining the type of the data, services the data;

responsive to not detecting data at the socket, monitors for an indication that network tunnel (TUN) data is available; and responsive to TUN data being available, obtains the TUN data from a shared resource, and writes the TUN data to the socket; and in a second thread of execution:

monitors for outgoing TUN data;

responsive to detecting outgoing TUN data, writes the outgoing TUN data to the shared resource; and provides the indication that TUN data is available.

16. The computing device of claim 15, wherein prior to obtaining the TUN data from the shared resource, the scattering application, in the first thread of execution, locks the shared resource against changes by a thread other than the first thread of execution, and after obtaining the TUN data from the shared resource, unlocks the shared resource for changes by a thread other than the first thread of execution.

17. The computing device of claim 15, wherein prior to writing the outgoing TUN data to the shared resource, the scattering application, in the second thread of execution, locks the shared resource against changes by a thread other than the second thread of execution, and after writing the outgoing TUN data to the shared resource, unlocks the shared resource for changes by a thread other than the second thread of execution.

18. The computing device of claim 15, wherein servicing the data includes writing the data to the TUN.

19. The computing device of claim 15, wherein after obtaining the TUN data from the shared resource and before writing the TUN data to the socket, the scattering application, in the first thread of execution, packages the TUN data according to a communication format of the scattering application.

20. The computing device of claim 15, wherein servicing the data includes performing a key exchange based on the data.

* * * * *